D. Du Pré,
Chain Pump,
N° 24,288. Patented June 7, 1859.
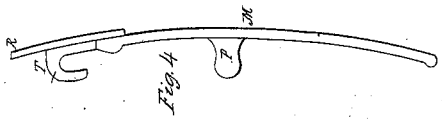
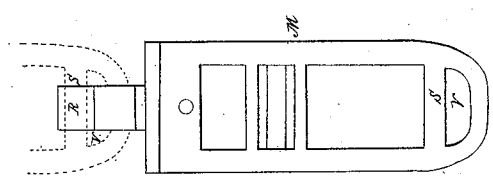
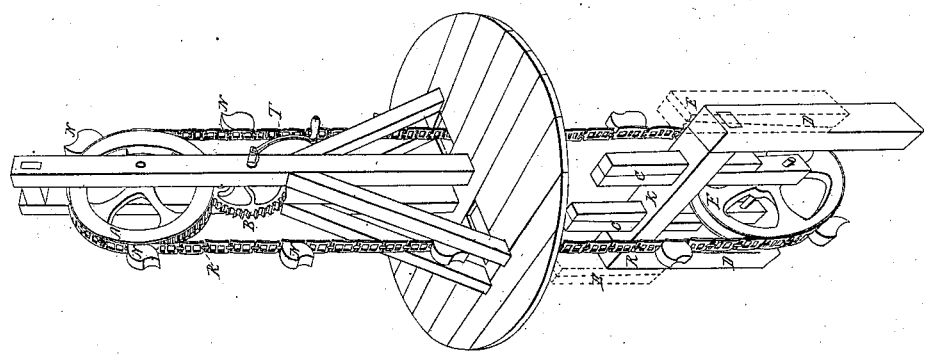
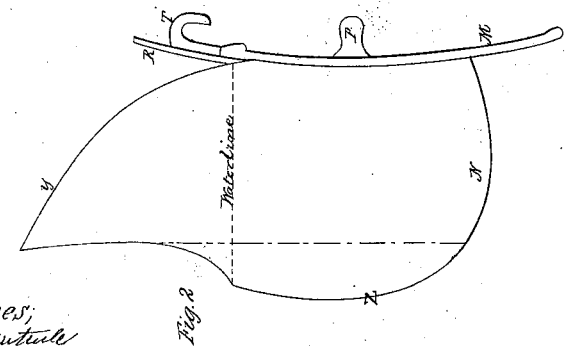
Witnesses:
Inventor:
Daniel Du Pré

UNITED STATES PATENT OFFICE.

DANIEL DU PRÉ, OF RALEIGH, NORTH CAROLINA, ASSIGNOR TO LOUIS DU PRÉ, OF DARLINGTON DISTRICT, SOUTH CAROLINA.

CHAIN PUMP.

Specification of Letters Patent No. 24,288, dated June 7, 1859.

*To all whom it may concern:*

Be it known that I, DANIEL DU PRÉ, of Raleigh, in the county of Wake and State of North Carolina, have invented a new and useful Improvement in Endless Chains and Buckets for Raising Water; and I do hereby declare that the following is a full, clear, and exact description of the same, reference being had to the accompanying drawings, forming a part of this specification, in which—

Figure 1, is a perspective view of the chain and bucket pump. Fig. 2, is a side view of the endless chain and one of the attached buckets. Fig. 3, is a plan view of chain link, and Fig. 4, is a side view of the said chain link.

Similar letters of reference in each of the several figures indicate corresponding parts.

My invention relates to improvements in the endless chain used to elevate water, and also, in conection with the peculiar shape of the links of the endless chain, to improvements in the form of the buckets.

To enable others, skilled in the art, to make and use my invention, I will proceed to describe its construction and operation.

In the drawing, Fig. 1, D, D, are uprights resting on the bottom of the well or reservoir which contains the water to be elevated, these uprights are connected by a cross beam K, in which are inserted inclined pieces C, C, which serve as bearings for the axle of the wheel F, which carries the endless chain M. The incline pieces C, may be fastened to the cross piece K, by means of wedges, as shown in the drawings or by other suitable means.

A, is a wheel which has its bearings in the uprights O, of the frame of the machine. The wheel A, may be cogged to mesh with a pinion B, to which the power is applied, or a pinion of larger diameter may be employed in lieu of the pinion B, the former giving motion to the endless chain by gearing into the projections P, on the endless chain, see Fig. 2. The endless chain M, which carries the buckets N, is made of links, any one of which can easily be detached from the chain, should it be desired, from its sustaining injury or from any other cause.

Figs. 3 and 4, show a plan and side views of the link; T, is a hooked projection on the underside of the link, which is attached or hooked into the open space V, of the next link, a projection R, attached to the lower link is brought to bear also upon the cross piece S, of the link above it, thereby stiffening and preventing any oscillation of the links of the chain independently of one another, and the consequent loss of water from the buckets. The links are also made curved in order that they may conform to the wheels A and D, by which they are carried, and thus the clogging of the chain is entirely obviated. As the links are curved in order to conform to the wheels which carry the endless chain, the bottoms of the buckets which are attached to said links are likewise curved and the faces Y, and Z, of the buckets are also curved in order that they may be less liable to injury from impact with obstructions they might meet with at the bottom of the reservoir or elsewhere (the curved form of the buckets tending to cause the buckets to ride over such obstructions should they be met with). By curving the faces of the buckets also as shown (see Fig. 2) the water is more apt to be retained than in the ordinary form of buckets as employed, and the buckets likewise can be more readily filled.

The advantages of my improvements are evident. The curved form of the links of the endless chain, causes the latter readily to conform to the wheels which carry it, thereby obviating the liability of clogging in the endless chain, and less power from the curved form of the link will be expended in driving the chain. By constructing the chain in links which are detachable, when any link is broken the chain may be easily and expeditiously repaired, by inserting another link in view of the injured one, and by reason of the device employed to prevent oscillation of the chain the liability of the water to be spilled or wasted is done away with, while the curved form of the bucket will cause them more readily to ride over any obstructions they may encounter, rendering them less liable to be broken or worn, while at the same time the form is such as seems best adapted to the retention of the water.

What I claim as my invention and desire to secure by Letters Patent, is—

1. The endless chain for raising water, composed of the curved detachable links

M, when said links are constructed and united in the manner and for the purposes set forth.

2. Keeping the chain stiff between the upper and lower pulleys, by means of projections R, on the links, substantially as and for the purpose set forth.

3. The combination of the curved links M, with the peculiarly shaped curved buckets N, when constructed and operated substantially in the manner and for the purposes set forth.

DANIEL DU PRÉ.

Witnesses:
CHARLES H. THOMPSON,
P. H. PEREND.